United States Patent
Jain

(10) Patent No.: US 10,218,695 B1
(45) Date of Patent: Feb. 26, 2019

(54) SYSTEMS AND METHODS FOR PROVIDING CREDENTIALLESS LOGIN USING A RANDOM ONE-TIME PASSCODE

(71) Applicant: Capital One Services, LLC, McLean, VA (US)

(72) Inventor: Chintan Jain, Ashburn, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/936,620

(22) Filed: Mar. 27, 2018

(51) Int. Cl.
*H04L 29/06* (2006.01)

(52) U.S. Cl.
CPC ...... *H04L 63/0838* (2013.01); *H04L 63/0846* (2013.01); *H04L 63/0861* (2013.01); *H04L 63/102* (2013.01); *H04L 63/108* (2013.01)

(58) Field of Classification Search
None
See application file for complete search history.

(56) References Cited

U.S. PATENT DOCUMENTS

| | | | |
|---|---|---|---|
| 6,880,079 B2 | 4/2005 | Kefford et al. | |
| 7,158,776 B1 | 1/2007 | Estes et al. | |
| 7,571,489 B2 | 8/2009 | Ong et al. | |
| 8,006,300 B2 | 8/2011 | Mizrah | |
| 8,041,954 B2 | 10/2011 | Plesman | |
| 8,233,882 B2 | 7/2012 | Rogel | |
| 8,495,720 B2* | 7/2013 | Counterman | H04L 9/3226 455/433 |
| 9,003,183 B2* | 4/2015 | Daly, Jr. | G06F 21/80 713/165 |
| 9,378,356 B2* | 6/2016 | Rockwell | G06F 21/43 |
| 9,443,073 B2* | 9/2016 | Oberheide | G06F 21/44 |
| 9,455,988 B2* | 9/2016 | Oberheide | G06F 21/44 |
| 9,641,341 B2* | 5/2017 | Oberheide | H04L 9/3247 |
| 9,825,765 B2* | 11/2017 | Oberheide | H04L 9/3247 |
| 9,836,233 B2* | 12/2017 | Daly | G06F 3/0619 |

(Continued)

OTHER PUBLICATIONS

Petsas et al, "Two-factor Authentication: Is the World Ready? Quantifying 2FA Adoption", Apr. 2015, ACM 978-1-4503-3479-2/15/04, p. 1-7.*

(Continued)

*Primary Examiner* — Christopher A Revak
(74) *Attorney, Agent, or Firm* — Troutman Sanders LLP; Christopher J. Forstner; John A. Morrissett

(57) ABSTRACT

A system includes one or more memory devices storing instructions, and one or more processors configured to execute the instructions to perform the steps of a method for providing a credentialless login for a user. The system may receive a request for credentialless login from a user of a mobile computing device. The system may then receive an authentication of a user accessing a software application running on a mobile computing device. Responsive to the receipt of the authentication, the system may generate a random one-time passcode associated with an account of the authenticated user and transmit the passcode to the mobile computing device for display to the user. The system may then receive the passcode from a second computing device and responsive to verifying the validity of the access code, grant the second computing device access to the account of the user.

20 Claims, 6 Drawing Sheets

(56) References Cited

U.S. PATENT DOCUMENTS

| | | | |
|---|---|---|---|
| 10,057,227 B1* | 8/2018 | Hess | H04L 63/08 |
| 2005/0197099 A1 | 9/2005 | Nehushtan | |
| 2007/0033642 A1 | 2/2007 | Ganesan et al. | |
| 2007/0220253 A1 | 9/2007 | Law | |
| 2008/0249947 A1 | 10/2008 | Potter | |
| 2013/0030934 A1* | 1/2013 | Bakshi | G06Q 20/40 |
| | | | 705/18 |
| 2013/0036458 A1 | 2/2013 | Liberman et al. | |
| 2014/0358745 A1* | 12/2014 | Lunan | G06Q 40/12 |
| | | | 705/30 |
| 2014/0380453 A1* | 12/2014 | Alonso Cebrian | |
| | | | H04L 63/0838 |
| | | | 726/9 |
| 2017/0094510 A1* | 3/2017 | Khosravi | G06F 21/32 |
| 2017/0214679 A1* | 7/2017 | Lin | H04L 63/083 |
| 2018/0007050 A1* | 1/2018 | Ruggiero | H04L 63/10 |

OTHER PUBLICATIONS

Sun et al, "TrustOTP: Transforming Smartphones into Secure One-Time Password Tokens", Oct. 2015, AM ISBN 978-1-4503-3832-5/15/10, p. 976-988.*
https://en.wikipedia.org/wiki/One-time_password.
https://www.polygon.com/2015/4/15/8424587/steam-mobile-app-two-factor-login-steam-guard.
http://store.steampowered.com/news/5123/.
https://www.onelogin.com/product/one-time-password.
https://krebsonsecurity.com/2011/02/google-adds-1-time-passwords-to-gmail-apps/.

* cited by examiner

SYSTEMS AND METHODS FOR PROVIDING CREDENTIALLESS LOGIN USING A RANDOM ONE-TIME PASSCODE

FIELD OF INVENTION

The present disclosure relates to systems and methods for providing a credentialless login (i.e., logging in without a username or password), and more particularly for enabling a user of a first device to login to an account on a second device without credentials by using a random one-time passcode.

BACKGROUND

An ever-present challenge for companies that provide users with online account access is the protection of user data. While most companies strive to ensure that user data is protected and not susceptible to breach, this is not always an easy task to achieve. One reason that this can be so challenging is that the credentials associated with a user's account, such as a username and password, are not always in the control of the company. Attempts have been made to increase the number of credentials that a user must enter upon logging into a website. Such attempts may require a user to enter a code in addition to the username and password or to answer a security question that is associated with the user's account. Such attempts still leave the user's credentials susceptible to being stolen by a third party that may have infiltrated the computer where the credentials are being entered. For example, a user may, in connection with logging into a website provided by the company, enter their credentials using a computer that the company has no control over or using a cpu (e.g., user's personal laptop, publicly available computer at a library, etc) in which the company has no knowledge of the security settings and capabilities. The computer the user uses to enter the credentials could be infected with viruses or another type of security breach which would allow a third party to access the credentials through keystroke logging software or some other means. The third party could then use the credentials to access the user's account and all associated user data. Accordingly, it may improve a company's ability to provide for the protection of user data to provide a means for the user to login to a company website on a potentially unprotected computer without entering the credentials associated with the user's account.

Accordingly, there is a need for improved systems and methods to provide users the ability to complete a credentialless login using a random one-time passcode. Embodiments of the present disclosure are directed to this and other considerations.

SUMMARY

Disclosed embodiments provide systems and methods for providing a credentialless login (i.e., logging in without a username or password), and more particularly for enabling a user of a first device to login to an account on a second device without credentials by using a random one-time passcode. Consistent with the disclosed embodiments, the system may include one or more memory devices storing instructions, and one or more processors configured to execute the instructions to perform steps of a method to provide users the ability to complete a credentialless login using a random one-time passcode. The system may receive, by a first computing device and from a second computing device, a request from a computing device for a credentialless login. The system may then receive, by the first computing device, an authentication of a user accessing a software application running on the computing device. Responsive to that receipt, the system may generate, by the first computing device, an access code associated with an account of the user and transmit, by the first computing device and to the second computing device, data representing the access code. The system may then receive, by the first computing device and from a third computing device, data representing a credentialless login attempt, the data representing the credentialless login attempt comprising an attempted access code. Based on a determination that the attempted access code matches the access code, the system may authorize the third computing device to access the account of the user.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
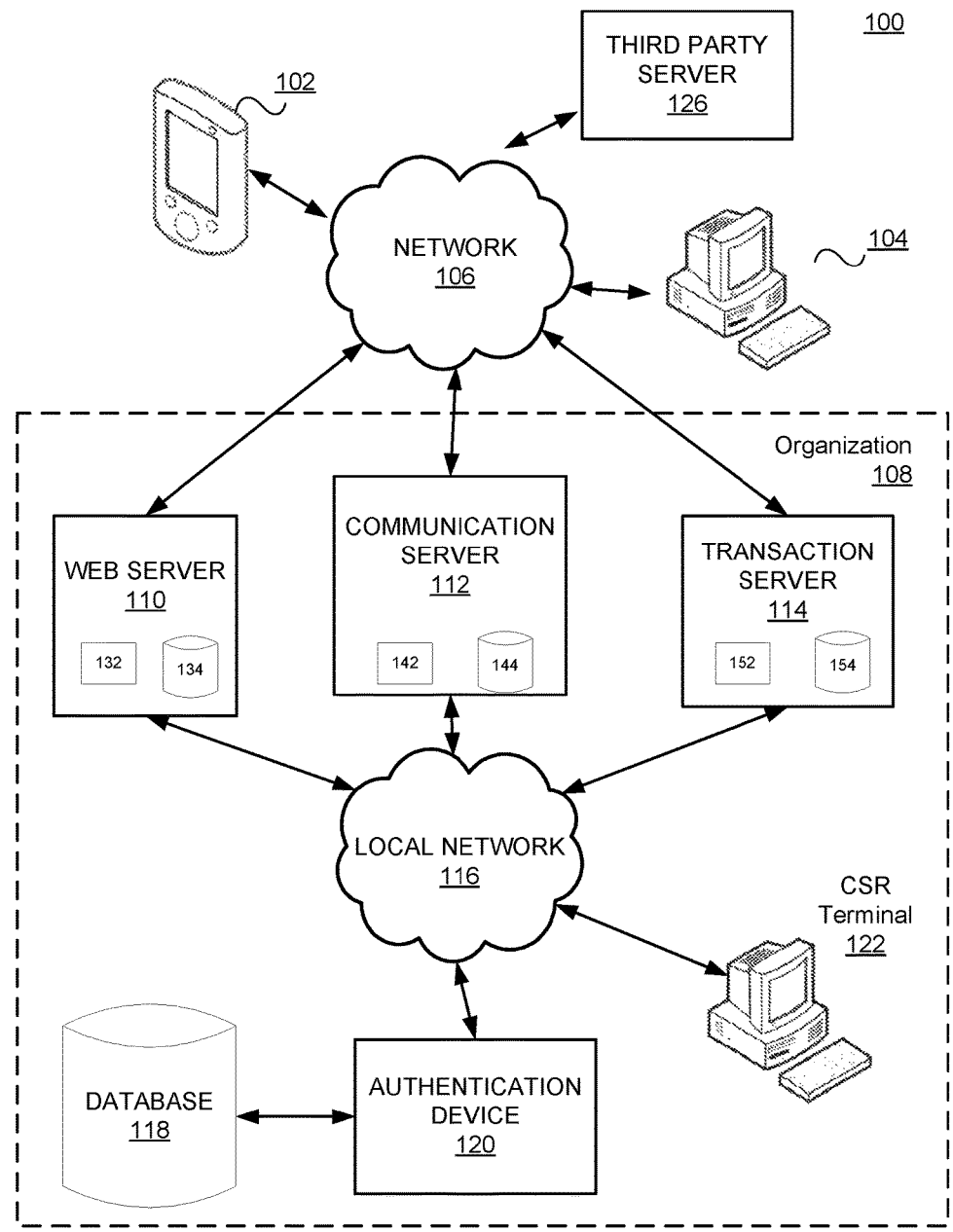
FIG. 1 is a diagram of an exemplary system that may be used to provide a credentialless login.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Embodiments of the present disclosure may allow a user to login to a device without credentials by receiving a one-time passcode at another device. Such embodiments allow for improved security of user data by providing a solution for protecting a user's account credentials when they are entered on a device infected with viruses or other types of security breaches which would allow a third party to steal the credentials through keystroke logging software or some other means. For example, instead of entering their credentials on the infected device, the user may enter a one-time passcode that is associated with their account. In this scenario, the infected device would still have access to the passcode, however because it is only good for one use, it would not subject the user's account to the malicious third party, such as would be the case if the user entered their account credentials using a compromised computer.

Embodiments of the present disclosure may allow a user to login to a device without credentials by receiving a one-time passcode at another device. The user may want to login without entering their credentials (i.e., username and/or password). To complete the credentialless login, for example, the user may open an application on their mobile device associated with a website they desire to login to and make a request for a one-time passcode by selecting an option in the mobile application. Before granting the request, the mobile application may require the user to verify his or her identity through the application. The user may accomplish the identity verification by entering biometric data to be compared against known biometric data. For example, a user may enter their fingerprint data through a fingerprint scanner on the user's mobile device, and the application running on the user's mobile device may compare the entered fingerprint to a fingerprint known to be from the user stored on the mobile device as a means of verifying the user's identity. Alternatively, other biometric data such as audio or facial images may be used to verifier the user's identity. Once the user's identity has been verified, the organization associated with the mobile application may generate a passcode and send it to the mobile application. The application on the user's mobile device may then display the passcode to the user. The user may then enter the passcode in a website running on a different device. For example, the user may receive the passcode on their mobile phone and enter the passcode in a web browser on their desktop or laptop computer. Once the passcode is validated, the user is granted access to their account, thus allowing the user to access their account on their device without having to remember or enter any credentials, such as a username or password.

In some embodiments, the user device may be a trusted device, or a device that has been previously verified to belong to the user. In this case, the organization may not need to further verify the user's identity in order to generate and send the access code to the user's device. For example, the organization may receive a request for a passcode from a trusted device and may generate the passcode.

In some other embodiments, the organization may interact with the customer through the use of an automated communication system. For example, instead of a user having to navigate through the device interface to find the correct application and then navigate through the application interface in order to submit a request for a passcode, the user may instead be able to send and receive communications to the automated communication system while a software application associated with the organization is operating in the background. For example, the user may be able to send a text message to the automated communication system requesting a passcode. The automated communication system may be able to determine the contents of the message and then send a text message back to the user requesting the user to validate their identity. In some embodiments, the user may be logged into a software application that is running in the background of their device such that the organization can communicate with the application to verify the user's identity without the user's involvement. In some embodiments, the organization may send a response to the user requiring the user to verify their identity within the application. Once the user's identity is validated, the automated communication system may send a text message with the passcode to the user. Such an embodiment including the automated communication system presents an advantage of allowing user's ease of use with the system by avoiding navigating multiple interfaces. Additionally, such an embodiment presents the advantage of using a known technology such as text messaging, that is be available on a multitude of devices and is presented in a way to allow user's that may not normally be able to use the system to be involved. For example, a user with vision loss may be able to use speak to text functionality associated with text messaging in order to interact with the system, when they may have otherwise had difficulty seeing a device display.

The disclosed embodiments are directed to systems and methods for providing users with the ability to complete a credentialless login using a random one-time passcode. The system may include one or more memory devices storing instructions, and one or more processors configured to execute the instructions to perform steps of a method. Specifically, in some embodiments, the system may provide users with the ability to complete a credentialless login (i.e., logging in without a username or password) using a random one-time passcode. To accomplish this, the system may execute the instructions to receive a request from a user accessing a software application running on the user's device to complete a credentialless login. The system may then require authentication of the user's identity. Upon receiving an indication that the user has been authenticated, the system may generate an access code associated with an account of the user and transmit data representing the access code to the application running on the user's device. The system may then receive an attempted access code entered on a different user device. Based on a determination that the attempted access code matches the access code, the system may authorize the different user device to access the account of the user.

In another embodiment, a system for providing users with the ability to complete a credentialless login using a random one-time passcode may include an environmental data sensor for obtaining biometric data, a geographic location sensor, an input/output device, a display, one or more processors including at least an authentication processor, and a memory in communication with the one or more processors. The memory in communication with the one or more processors may store instructions that, when executed by the one or more processors, are configured to cause the system to receive login credentials associated with a user using a mobile application on a user device. The system may then obtain known biometric data associated with the user. After obtaining the known biometric data, the system may store the user's known biometric data. The system may then obtain user identification data, wherein user identification data comprises data representing biometric data associated with a user. After obtaining the user identification data, the system may compare the user identification data with the user's known biometric data. Responsive to determining that the user verification data matches the user's known biometric data, within a predetermined confidence level, the system may transmit user verification data to the organization, wherein user verification data comprises data representing an indication that the user's identity has been verified. The system may then transmit a user verification communication to the organization, wherein the user verification communication comprises data representing a request for credentialless login. After the system transmits the user verification communication, the system may receive an access code associated with an account of the user. The system may then display the access code associated with an account of the user for use in association with a credentialless login attempt.

In another embodiment, a system for providing users with the ability to complete a passwordless login using a username and a random one-time passcode may include one or more memory devices storing instructions, and one or more processors configured to execute the instructions to perform steps of a method. Upon executing the instructions, the system may receive a first inbound communication comprising data representing a request for passwordless login. The system may then determine, meaning using natural language processing or machine learning, the content of the first inbound communication. After the determination is made, the system may generate a first outbound communication comprising a request for verification of the identification of a user of the second computing device. The system may then transmit the first outbound communication. After transmitting the first outbound communication, the system may receive a second inbound communication comprising user verification data, wherein user verification data comprises data representing an indication that the user's identity has been verified by the second computing device. The system may then determine the content of the second inbound communication. After the determination is made, the system may generate an access code associated with an account of the user. The system may then generate a second outbound communication comprising data representing the access code. After generating the access code, the system may transmit the second outbound communication. The system may then receive data representing a passwordless login attempt comprising a username associated with an account of the user and an attempted access code. Finally, the system may authorize access to the account of the user based on a determination that the attempted access code matches the access code associated with the account associated with the entered username.

Although the above embodiments are described with respect to systems, it is contemplated that embodiments with identical or substantially similar features may alternatively be implemented as methods and/or non-transitory computer-readable media.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more processes that can provide users with the ability to complete a credentialless login using a random one-time passcode. The components and arrangements shown in FIG. 1 are not intended to limit the disclosed embodiments as the components used to implement the disclosed processes and features may vary. As shown, system 100 may include a first user device 102, a second user device 104, a third party server 126, a network 106, and an organization 108 including, for example, a web server 110, a communication server 112, a transaction server 114, a local network 116, an authentication device 120, a database 118, an user service representative (CSR) terminal 122 (which may also be referred to as a user service terminal).

In some embodiments, a user may operate first user device 102 and second user device 104. User devices 102, 104 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108 or with third party server 126. In some embodiments, a user device may include or incorporate electronic communication devices for hearing or vision impaired users. User devices 102, 104 may belong to or be provide by a user, or may be borrowed, rented, or shared. Users may include individuals such as, for example, subscribers, clients, prospective clients, or users of organization 108, such as individuals who have obtained, will obtain, or may obtain a product, service, or consultation from organization 108. According to some embodiments, user devices 102, 104 may include one or more sensors sensor for obtaining biometric data associated with the user, such as a fingerprint scanner, a microphone and/or digital camera, a geographic location sensor for determining the location of the device, an input/output device such as a transceiver for sending and receiving data, a display for displaying digital images, one or more processors including an authentication processor, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Third party server 126 may comprise a computer system associated with an entity other than organization 108 and users that performs one or more functions associated with the individual and organization 108. For example, third party server 126 can comprise a user verification system that allows a user of user device 102 to verify their identity in order to interact with organization 108. In some embodiments, third party server 126 may be used in conjunction with authentication of a user of a mobile application running on user device 102. In some embodiments, third party server 126 may be a server hosted by organization 108. According to some embodiments, third party server 126 may be a server hosted by a party or entity other than organization 108. In some embodiments, third party server 126 may user protocols such as OAuth and OpenIDConnect in order to verify the identity of a user of a mobile application running on user device 102. In some embodiments, for example, third party 126 server may be a server associated with the manufacture of user device 102.

Organization 108 may include an entity such as a business, corporation, individual, partnership, or any other entity that provides one or more of goods, services, and consultations to individuals such as users.

Organization 108 may include one or more servers and computer systems for performing one or more functions associated with products and/or services that organization 108 provides. Such servers and computer systems may include, for example, web server 110, communication server 112, and/or transaction server 114, as well as any other computer systems necessary to accomplish tasks associated with organization 108 or the needs of users.

Web server 110 may include a computer system configured to generate and provide one or more websites or mobile applications accessible to users, as well as any other individuals involved in organization 108's normal operations. Web server 110 may have one or more processors 132 and one or more web server databases 134, which may be any suitable repository of website or mobile application data. Information stored in web server 110 may be accessed (e.g., retrieved, updated, and added to) via local network 116 and/or network 106 by one or more devices (e.g., authentication device 120 or user device 102) of system 100. In some embodiments, processor 132 may be used to implement a credentialless login system that may interact with a user via a website, a mobile application, or a combination of the two.

In some embodiments, web server 110 may track and store event data regarding interactions between user devices 102, 104 associated with a user such as a user and organization 108. For example, web server 110 may track user interactions such as login requests, login attempts, successful logins, trusted device requests, and any other type of interaction that third party server 126 may conduct with organization 108 on behalf of a user such as user.

In some embodiments, communication server 112 may include a computer system configured to receive, process, generate, and transmit electronic communications between a user operating user device 102, and any other computer systems necessary to accomplish tasks associated with organization 108 or the needs of users. Communication server 112 may have one or more processors 142 and one or more communication databases 144, which may be any suitable repository of communication data. Information stored in communication server 112 may be accessed (e.g., retrieved, updated, and added to) via local network 116 and/or network 106 by one or more devices (e.g., authentication device 120) of system 100. In some embodiments, communication server processor 142 may be used to implement an IVR system that interacts with the user over the phone. In some embodiments, communication server processor 142 may be used to implement an automated messaging system employing natural language processing or machine learning that interacts with the user over the phone.

Transaction server 114 may include a computer system configured to process one or more transactions involving an account associated with users, or a request received from users. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that organization 108 provides to individuals such as users. Transaction server 110 may have one or more processors 152 and one or more transaction server databases 154, which may be any suitable repository of transaction data. Information stored in transaction server 110 may be accessed (e.g., retrieved, updated, and added to) via local network 116 and/or network 106 by one or more devices (e.g., authentication device 120) of system 100.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In some embodiments, components of organization 208 may communicate via network 106, without a separate local network 116.

Authentication device 120 may comprise one or more computer systems configured to compile data from a plurality of sources, such as web server 110, communication server 112, and transaction server 114, correlate compiled data, analyze the compiled data, arrange the compiled data, generate derived data based on the compiled data, and storing the compiled and derived in a database such as database 118. According to some embodiments, database 118 may be a database associated with organization 108 that stores a variety of information relating to users, transactions, and business operations. Database 118 may also serve as a back-up storage device and may contain data and information that is also stored on, for example, databases 134, 144, 154, 260, 270, and 280. Database 118 may be accessed by authentication device 120 and may be used to store the generated access codes that are associated with user accounts. Additionally, in some alternate embodiments, database 118 may be accessed by authentication device 120 and may be used to store known biometric data associated with a user.

CSR terminal 122 may be, but is not limited to a terminal, a desktop computer, a laptop computer, a mobile device such as a smart phone or tablet device, and any other computerized devices configured to communicate with local network 116 to perform various functions relating to organization 108 such as, for example, receiving telephone calls and messages and conducting teleconferences with users, viewing one or more interfaces generated by authentication device 120, and any other functions associated with organization 108's products or services including viewing information associated with user accounts and communicating with users. An employee may operate CSR terminal 122, and the employee may comprise any individual employed by organization 108 or involved in the operations of organization 108 including, for example, a user service agent, an account manager, a product or service manager, a clerk, etc. In some embodiments, an employee may verify a user's identity and then instruct authentication device 120 to generate an access code associated with the user's account that will be sent to the user by the employee. In some embodiments, organization 108 may comprise a plurality of CSR terminals 122 and employees, and various CSR terminals 122 may serve varying functions for organization 108. As an example, a first CSR terminal 122 may provide call center functions for an employee performing the duties of a user service representative. As another example, a second CSR terminal 122 may provide chat or message center functions for an employee performing the duties of a user service representative. In another example one CSR terminal 112 may provide both call center functions and chat or message center functions for an employee performing the duties of a user services representative.

Although the preceding description describes various functions of web server 110, communication server 112, transaction server 114, authentication device 120, database 118, and a CSR terminal 122, in some embodiments, some or all of these functions may be carried out by a single computing device.

For ease of discussion, embodiments may be described in connection with the generation of an access code to allow credentialless login to a user's account on a website. It is to be understood, however, that disclosed embodiments may be used in many other contexts. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

Figure 2:
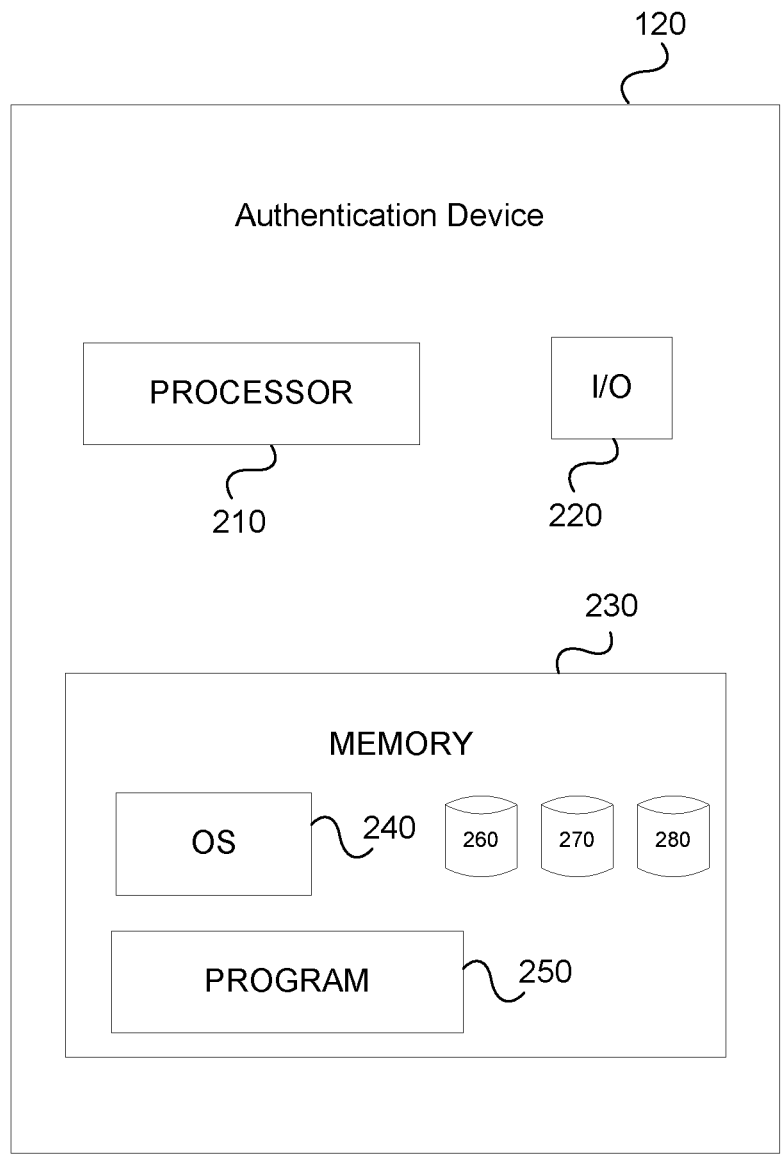
FIG. 2 is a component diagram of an exemplary authentication device.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter An exemplary embodiment of authentication device 120 is shown in more detail in FIG. 2. User devices 102,104, web server 110, communication server 112, transaction server 114, CSR terminal 122, and third party server 126 may have a similar structure and components that are similar to those described with respect to authentication device 120. As shown, authentication device 120 may include a processor 210, an input/output ("I/O") device 220, a memory 230 containing an operating system ("OS") 240 and a program 250. For example, authentication device 120 may be a single server or may be configured as a distributed computer system including multiple servers or computers that interoperate to perform one or more of the processes and functionalities associated with the disclosed embodiments. In some embodiments, authentication device 120 may further include a peripheral interface, a transceiver, a mobile network interface in communication with processor 210, a bus configured to facilitate communication between the various components of authentication device 120, and a power source configured to power one or more components of authentication device 120.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. In some embodiments, processor 210 may be an application or authentication processor that may execute user authentication processes or other processes necessary for running an application associated with the organization 108 on user device 102. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Authentication device 120 may include one or more storage devices configured to store information used by processor 210 (or other components) to perform certain functions related to the disclosed embodiments. In one example authentication device 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, authentication device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, authentication device 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, MySQL databases, Postgres databases, MongoDB databases, in-memory caching solutions such as Redis or Memcached, or other relational or non-relational (e.g., non sql) databases. Memory 230 may include software components that, when executed by processor 210, perform one or more processes consistent with the disclosed embodiments. In some embodiments, memory 230 may include a user account database 260, a user interaction database 270, and a user feedback database 280 for storing related data to enable authentication device 120 to perform one or more of the processes and functionalities associated with the disclosed embodiments. User account database 260 may include stored data relating to user accounts, such as for example, user identification information (e.g., name, age, sex, birthday, address, VIP status, key user status, preferences, preferred language, vehicle(s) owned, greeting name, channel, talking points (e.g., favorite sports team), etc.), bank accounts, mortgage loan accounts, car loan accounts, and other such accounts. User account data stored in user account database 260 may include account numbers, authorized users associated with one or more accounts, login credentials, known biometric data associated with the user, account balances, account payment history, and other such typical account information. User interaction database 270 may include stored data relating to previous interactions between organization 108 and a user. For example, user interaction database 270 may store user interaction data that includes records of previous user login attempts via a website, application running on a mobile device, or other application associated with organization 108 and accessible by a user. Such data may be used by organization 108 to store patterns (e.g., login times, login locations or geolocation data, login device identification information, login device browser information and specifications, login device operating systems information and version information, internet service provider information, mobile carrier information, etc) of user logins that may be used for user verification or to ascertain the identification of the user device being used for user verification. User interaction data may also include information about business transactions between organization 108 and a user. User communication database 280 may include stored data relating to a communication received from user that relate to user requests for logging into a website or application associated with organization 108 and accessible to a user. For example, user communication data stored by user communication database 280 may include information about previous login attempts such as location(s) of the device(s) associated with login attempt(s), location of devices associated with successful login attempts, location of devices associated with failed login attempts, or any other types of information related to a user's attempted login to a website or application associated with organization 108. Although databases 260, 270, 280 have been described as being separate databases for the purposes of the present discussion, these databases may alternately be combined into one or more databases.

Authentication device 120 may also be communicatively connected to one or more memory devices (e.g., databases (not shown)) locally or through a network. The remote memory devices may be configured to store information and may be accessed and/or managed by authentication device 120. By way of example, the remote memory devices may be document management systems, Microsoft™ SQL databases, SharePoint™ databases, Oracle™ databases, Sybase™ databases, My SQL databases, Postgres databases, MongoDB databases, in-memory caching solutions such as Redis or Memcached, or other relational or non-relational (e.g., non sql) databases. Systems and methods consistent with disclosed embodiments, however, are not limited to separate databases or even to the use of a database.

Authentication device 120 may also include one or more I/O devices 220 that may comprise one or more interfaces for receiving signals or input from devices and providing signals or output to one or more devices that allow data to be received and/or transmitted by authentication device 120. In exemplary embodiments of the disclosed technology, authentication device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While authentication device 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the authentication device 120 may include a greater or lesser number of components than those illustrated.

Figure 3:
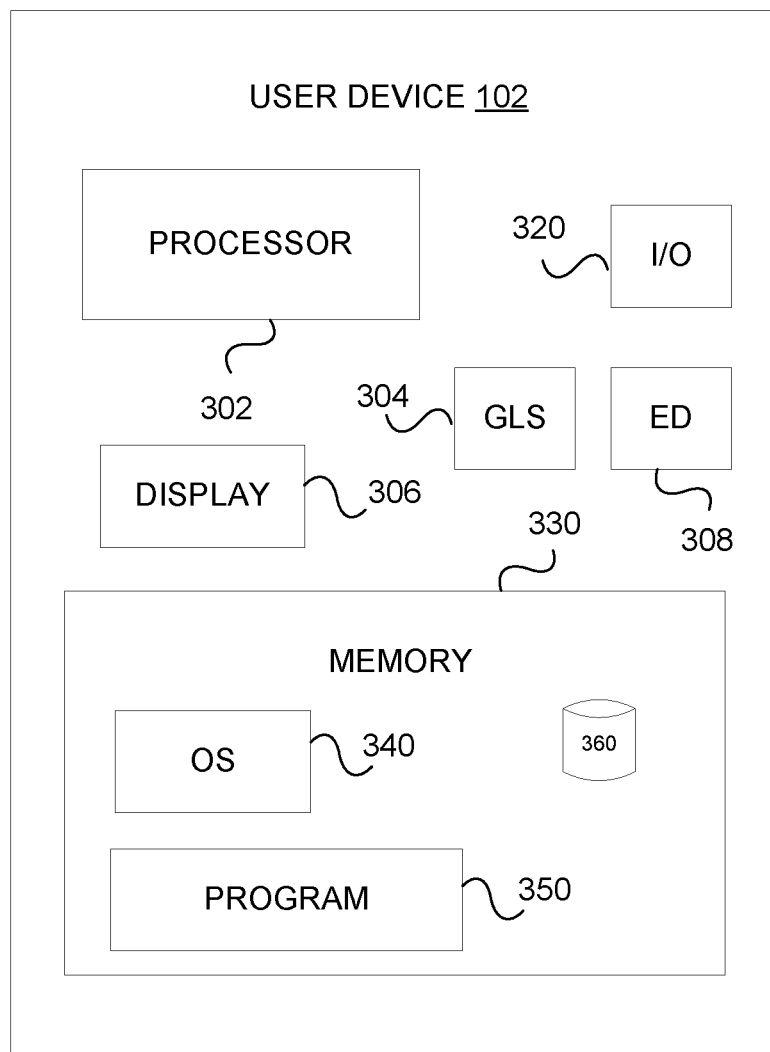
FIG. 3 is a component diagram of an exemplary user device.

FIG. 3 shows an exemplary interactive embodiment of user device 102. As shown, user device 102 may include an input/output ("I/O") device 220, a memory 330 containing an operating system ("OS") 340, a program 350, a database 360, and all associated components as described above with respect to authentication device 120. User device 102 may also include an authentication processor 302 for generating user identity verification data, a geographic location sensor ("GLS") 304 for determining the geographic location of user device 102, a display 306 for displaying digital images, and an environmental data ("ED") sensor 308 for detecting biometric data. In some embodiments, an environmental data sensor 308 may include, for example but not limited to a fingerprint scanner, an eye or retina scanner, a voice recorder, a microphone, a digital camera for use in facial recognition, and/or a gyroscope for detecting authenticating motions. In some embodiments, user device 102 may include one or more processors. In some embodiments, user device 102 may receive by ED 308 user data and may compare by authentication processor 302 the collected data with known data about the user. For example, in some embodiments, user device 102 may receive by a gyroscope an authenticating motion and may compare by authentication processor 302 the received authenticating motion to one previously received from the user. In some embodiments, an authenticating motion may be a motion representing the user imitating signing their name with user device 102. According to some embodiments, authentication processor 302 may include all of the features and functions of processor 210 described above. User device 104 may have some or all of the features shown and described with respect to FIG. 3.

Figure 4:
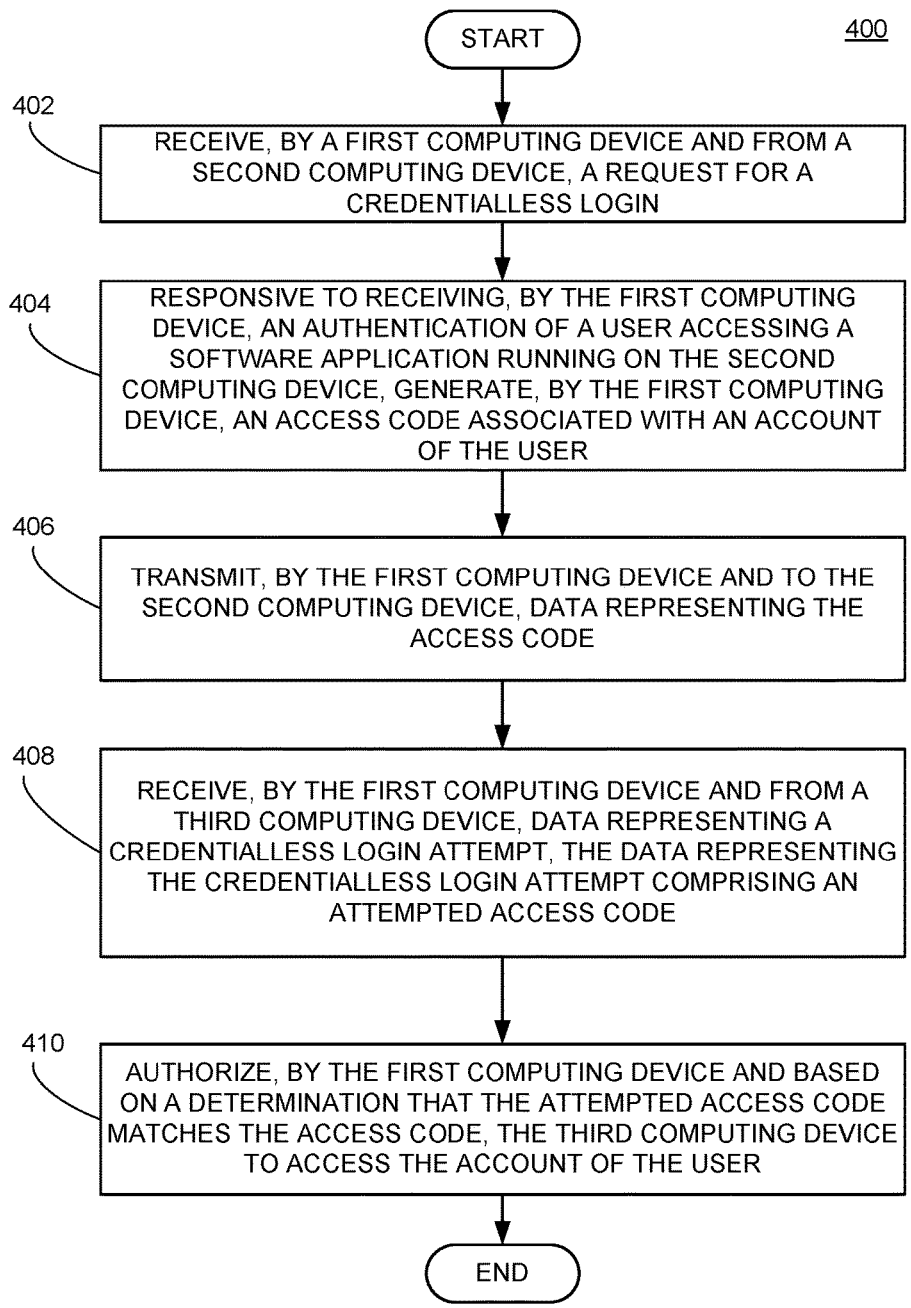
FIG. 4 is a flowchart of an exemplary method for providing credentialless login.

FIG. 4 shows a flowchart of method 400 for providing users with the ability to complete a credentialless login using a random one-time passcode. Method 400 may be performed by authentication device 120 using processor 210 to execute memory 230. In some embodiments, steps of method 400 may be performed by other elements in system 100, such as user devices 102, 104, third party server 126, web server 110, communication server 112, transaction server 114, or CSR terminal 122. Following method 400, the system, by authentication device 120, for example, may generate an access code, which in some embodiments may include a random one-time passcode. The system may transmit the code to the user, for example, by communication server 112 and to user device 102, and may authorize access to a user that enters the passcode into a website via another device, for example, via user device 104.

In block 402, organization 108 may receive request from user device 102 for a credentialless login. In some embodiments, a credentialless login may comprise a login where a user need not enter a username or password to log into an account that would otherwise typically require the submission of the correct associated username and password to successfully log in to the account. For example, in some embodiments, communication server 112 may receive a request through network 106 from a user that selects an option in a software application running on user device 102. Communication server 112 may determine the contents of the request and forward the request to authentication device 120 through local network 116. In some embodiments, authentication device 120 may receive a request through network 106 from a user that selects an option in an application running on user device 102. According to some embodiments, authentication device 120 may subsequently determine the contents of the request. In some embodiments, CSR terminal 112 may receive a request through network 106 from a user that selects an option in an application running on user device 102. In some embodiments, CSR terminal 112 may in turn determine the contents of the request and forward the request to authentication device 120 through local network 116. In some embodiments, the communication channel between the software application running on user device 102 and organization 108 may be encrypted using standard protocols such as TLS, TCP, SSH, or other appropriate protocols. In some embodiments, the communication channel between the software application running on user device 102 and organization 108 may be encrypted using application or organization specific protocols specifically developed for the organization.

At step 404, organization 108 may receive a message including data indicating that the identity of the user accessing a software application running on user device 102 has been authenticated. For example, in some embodiments, organization 108 may receive data at authentication device 120 and from user device 102 representing an indication that biometric data associated with the user that is obtained by user device 102 matches, within a predetermined confidence level, to known biometric data associated with the user and stored on user device 102. For example, in some embodiments, organization 108 may receive biometric information from a user that may be converted into data and the organization 108 can compare the data to known data. In some embodiments, if the received data matches the known data by a predetermined threshold (e.g., 50%, 60%, 95%, etc.), then the data will be deemed to match. In some embodiments, organization 108 may receive data from authentication device 120 representing an indication that biometric data associated with the user that is obtained by ED 308 of user device 102 matches, within a predetermined confidence level, to known biometric data associated with the user and stored on database 118. In some embodiments, the biometric data associated with the user of user device 102 and the known biometric data are fingerprint data obtained from a fingerprint scanner of user device 102 (i.e., ED 308 of user device 102). According to some embodiments, the biometric data associated with the user of user device 102 and the known biometric data are voice recordings obtained from a microphone of user device 102 (i.e., ED 308 of user device 102). In some embodiments, known biometric data can be previously and/or remotely stored data obtained from user device 102 or other suitable device. In some embodiments, the biometric data associated with the user of user device 102 and the known biometric data are image data obtained from an image capture device associated with user device 102 (i.e., ED 308 of user device 102). According to some embodiments, the biometric data associated with the user of user device 102 and the known biometric data are any suitable data that may be obtained from ED 308, associated with user device 102 that will serve to verify the identity of the user of a software application running on user device 102. For example, in some embodiments, user device 102 may receive by a gyroscope an authenticating motion and may compare by authentication processor 302 the received authenticating motion to one previously received from the user. In some embodiments, an authenticating motion may be a motion representing the user imitating signing their name with user device 102. In some embodiments, for example, user device 102 may receive by a digital camera, a photograph of the user's face and may compare the photograph to a known photograph that is accessible to user device 102. Responsive to the receipt of message including data indicating that the identity of the user accessing a software application running on user device 102 has been authenticated, authentication device 120 may generate an access code associated with an account of the user. In some embodiments, the access code associated with the account of the user is a randomly generated access code of varying length and type of digit. In some embodiments, the length and type of digit of the randomly generated access code can depend on the type information held in the account of the user. For example, in some embodiments, the access code could be generated for an account associated with online banking and the access code could be a randomly generated 16-digit alphanumeric code. According to some embodiments, the access code could be generated for an account associated with online shopping and the access code could be a randomly generated 8-bit numeric code. It will be appreciated by those of skill in the art that the length and type of code could vary based on the application. In some embodiments, the access code associated with an account of the user is only valid for a predetermined period of time. According to some, the access code associated with an account of the user is only valid for a single use.

At step 406, organization 108 may transmit data representing the access code to user device 102. For example, authentication device 120 may send data representing the access code to communication server 112 through local network 116, and communication server 112 may generate a message or communication based on data representing the access that is transmitted to user device 102 through network 106. In some embodiments, the message may be transmitted through a secure channel between organization 108 and user device 102. As previously discussed, in some embodiments, the communication channel between the software application running on user device 102 and organization 108 may be encrypted using standard protocols such as TLS, TCP, SSH, or other appropriate protocols. In some embodiments, the communication channel between the software application running on user device 102 and organization 108 may be encrypted using application or organization specific protocols specifically developed for the organization.

At step 408, organization 108 may receive data representing a credentialless login attempt from user device 104, the data representing the credentialless login attempt comprising an attempted access code. For example, communication server 112 may receive through network 106 and from user device 104, the attempted access code that was input by the user on user device 104. In some embodiments, the message may be received through a secure channel between organization 108 and user device 104. In some embodiments, the communication channel between the software application running on user device 104 and web server 110 may be encrypted using standard protocols such as TLS, TCP, SSH, or other appropriate protocols. According to some embodiments, the communication channel between the software application running on user device 104 and web server 110 may be encrypted using application or organization specific protocols specifically developed for the organization.

At step 410, organization 108 authorizes, based on a determination that the attempted access code matches the access code, user device 104 to access the account of the user. For example, the transaction server 114 may receive the attempted access code and may send it to authentication device 120 via local network 116. Authentication device 120 may then retrieve the access code from database 118 and may determine whether the attempted access code matches the access code. If the attempted access code matches the access code, authentication device 120 may send a message to web server 110 through local network 116 informing the web server 110 to grant access to the account of the user on user device 104 via network 106. In some embodiments, authorizing user device 104 to access the account of the user may further be based on a determination that the access code is valid. In some other embodiments, determining that the access code is valid may further comprise receiving, by organization 108, device location data from each user device 102, 104 and determining that the that the device location data of user device 102 matches the device location data of user device 104. In some embodiments, device location data may be data indicating the location (i.e., GPS data, longitude, latitude, triangulated position from cell tower or wifi access point, city, state, country, time zone, etc) of user devices 102, 104. According to some embodiments, device location data may include unique device characteristics such as time zone, operating system version, browser version, user agent information, IP address, wireless carrier information, internet service provider information, or, other data indicating the location or other device characteristic. In some embodiments, determining that the access code is valid may further comprise receiving, by organization 108, device location data from each user device 102, 104 and determining that the that the device location data of user device 102 is similar or complimentary to the device location data of user device 104. In some embodiments, for example, the access code may only be valid for a predetermined period of time. For example, in some embodiments, the access code may expire five minutes after it is created. According to another example embodiment, the access code may expire five minutes after it is transmitted to user device 102. In some embodiments, determining that the access code is valid may further comprise determining whether or not the predetermined period of time has passed. In some additional embodiments, the access code may only be valid for a single use. According to some embodiments, determining that the access code is valid may further comprise determining whether or not the access code has been previously received by a device of organization 108 (e.g., web server 110, communication server 112, transaction server 114, CSR terminal 122, authentication device 120, etc).

Figure 5:
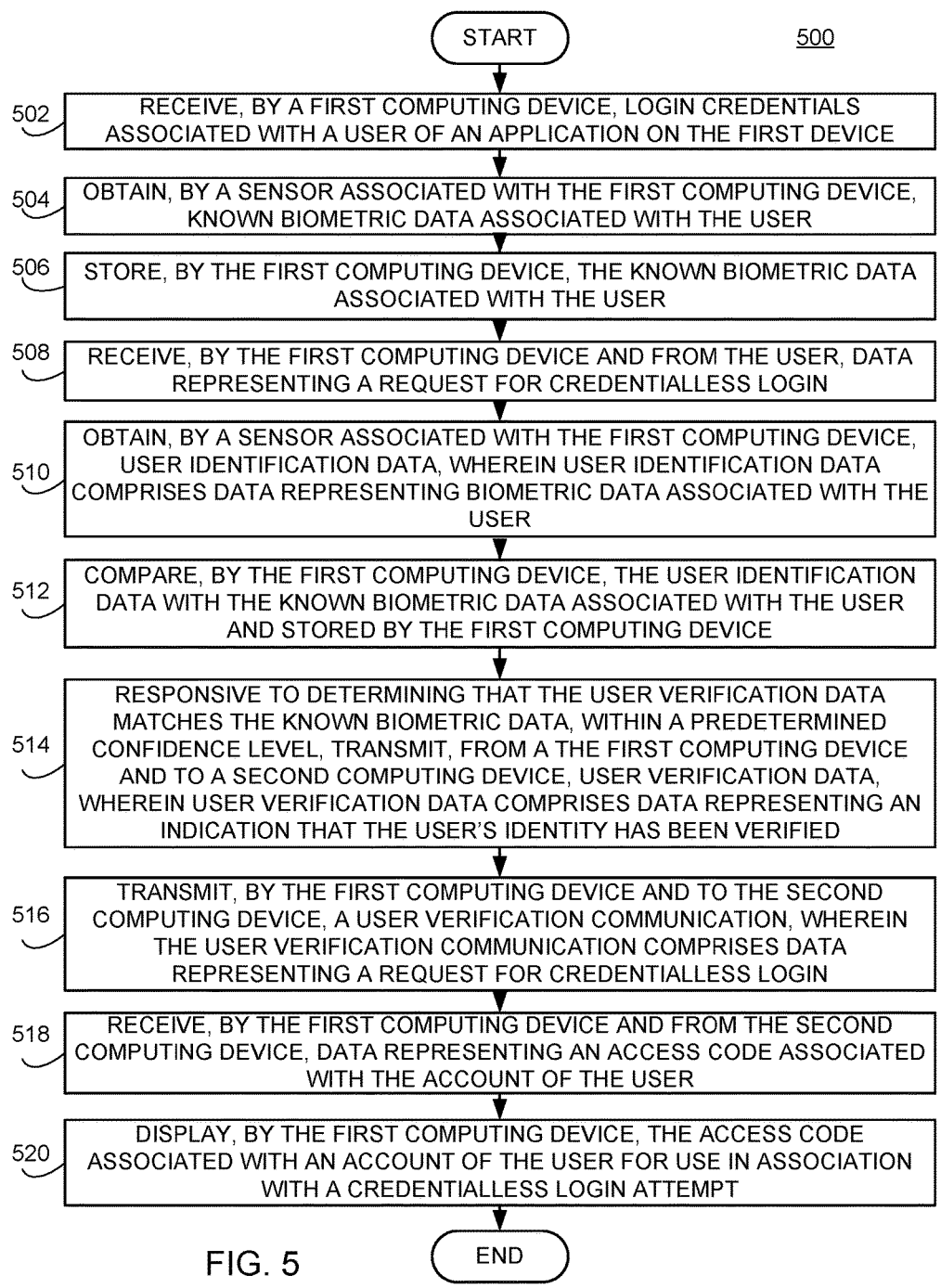
FIG. 5 is a flowchart of an exemplary method for providing credentialless login.

FIG. 5 shows a flowchart of a method 500 for providing users with the ability to complete a credentialless login using an access code (e.g., a random one-time passcode). Method 500 may be performed by user device 102 using processor 302 to execute memory 3300. In some embodiments, steps of method 500 may performed by other elements in system 100, such as user devices 102, 104, third party server 126, web server 110, communication server 112, transaction server 114, or CSR terminal 122. Following method 500, the system may generate a random one-time passcode, for example, by authentication device 120, may transmit the code to the user, for example, by communication server 112 and to user device 102, and may authorize access to a user that enters the passcode into a website via another device, for example, via user device 104.

In block 502, user device 102 may receive login credentials associated with a user of a software application running on user device 102. For example, user device 102 may receive from the user, the username and password associated with an account of the user in a software application running on user device 102 that is associated with organization 108. In some embodiments, user device 102 may receive the username and password that user entered into I/O 220 of user device 102 and the username and password may be stored in memory 330 of user device 102. In some embodiments, user device 102 may receive the username and password that user typing it into a keyboard associated with user device 102. According to some embodiments, user device 102 may receive the username and password that user speaks into a microphone associated with user device 102 and user device 102 may interpret the username and password using speech to text processing.

At step 504, user device 102 may obtain, by a sensor associated with user device 102 known biometric data associated with the user. For example, in some embodiments, biometric data may be obtained from the user by requiring the user to enter the biometric data into ED 308 of user device 102. In some embodiments, the known biometric data may be fingerprint data obtained from a fingerprint scanner of user device 102 (i.e., ED 308 of user device 102). According to some embodiments, the known biometric data may be voice recordings obtained from a microphone of user device 102 (i.e., ED 308 of user device 102). In some embodiments, the known biometric data may be image data obtained from an image capture device associated with user device 102 (i.e., ED 308 of user device 102). According to some embodiments, the known biometric data may be any suitable data that may be obtained from environmental data sensor, ED 308, associated with user device 102 that will serve to verify the identity of the user of a software application running on user device 102.

At step 506, user device 102 may store the known biometric data on user device 102. For example, in some embodiments, user device 102 may receive the known biometric data from a user via ED 308 associated with user device 102 and may store the known biometric data in memory 330. In some embodiments, known biometric data may be stored in user account database 260 associated with user device 102. According to some embodiments, known biometric data may be stored in any other suitable database associated with user device 102.

At step 508, user device 102 may receive a request from the user for a credentialless login. In some embodiments, a credentialless login may comprise a login where a user need not enter a user name of password of an account associated with the user. For example, in some embodiments, user device 1-2 may receive a request for a one-time passcode to be used with a credentialless login when a user may select an option in a software application or program 250 running on user device 102. In some embodiments, user device 102 may receive a request for a one-time passcode to be used with a credentialless login when the user enters the request into I/O 220 of user device 102. According to some embodiments, user device 102 may receive a request for a one-time passcode to be used with a credentialless login when the user enters the request by selection an option in a GUI that may be displayed by to the user by display 306 of user device 102. In some other embodiments, user device 102 may receive a request for a one-time passcode to be used with a credentialless login when the user speaks the request into a microphone associated with user device 102 and user device 102 may interpret the request using speech to text processing.

At step 510, user device 102 may obtain, by a sensor associated with user device 102 user identification data, wherein user identification data comprises data representing biometric data associated with the user. For example, in some embodiments, user identification data may be obtained from the user by requiring the user to enter the biometric data into ED 308 of user device 102. In some embodiments, the user identification data may be fingerprint data obtained from a fingerprint scanner of user device 102 (i.e., ED 308 of user device 102). According to some embodiments, the user identification data may be voice recordings obtained from a microphone of user device 102 (i.e., ED 308 of user device 102). In some embodiments, the user identification data may be image data obtained from an image capture device associated with user device 102 (i.e., ED 308 of user device 102). According to some embodiments, the user identification data may be any suitable data that may be obtained from environmental data sensor, ED 308, associated with user device 102 that will serve to verify the identity of the user of a software application running on user device 102.

At step 512, user device 102 may compare the user identification data to the known biometric data associated with the user and stored on user device 102. For example, in some embodiments, user device 102 may retrieve known biometric data from memory 330 associated with user device 102 and may compare the known biometric data to the user identification data by processor 302. In some embodiments, user device 102 may store the results of the comparison in memory 330. According to some embodiments, user device 102 may determine that the user identification data does not match the known biometric data, within a predetermined confidence level. In some embodiments, user device 102 may prompt the user to reenter user identification data in order to repeat step 512.

At step 514, responsive to determining that the user verification data matches the known biometric data, within a predetermined confidence level, user device 102 may transmit to organization 108 and through network 106 user verification data, wherein user verification data comprises data representing an indication that the user's identity has been verified. For example, in some embodiments, user device 102 may transmit user verification data to communication server 112 through network 106. According to some embodiments, user device 102 may transmit user verification data to transaction server 114 through network 106. In some embodiments, the communication channel between the software application running on user device 102 and organization 108 may be encrypted using standard protocols such as TLS, TCP, SSH, or other appropriate protocols. In some embodiments, the communication channel between the software application running on user device 102 and organization 108 may be encrypted using application or organization specific protocols specifically developed for the organization.

At step 516, user device 102 may transmit a user verification communication, wherein the user verification communication comprises data representing a request for credentialless login. For example, in some embodiments, user device 102 may transmit the user verification communication to communication server 112 through network 106. According to some embodiments, user device 102 may transmit the user verification communication to transaction server 114 through network 106. In some embodiments, the communication channel between the software application running on user device 102 and organization 108 may be encrypted using standard protocols such as TLS, TCP, SSH, or other appropriate protocols. In some embodiments, the communication channel between the software application running on user device 102 and organization 108 may be encrypted using application or organization specific protocols specifically developed for the organization.

At step 518, user device 102 may receive from organization 108 data representing an access code associated with the account of the user. For example, in some embodiments, user device 102 may receive the access code associated with the user device at I/O 220 from communication server 112 and through the network 106. In some embodiments, the access code associated with the account of the user is a randomly generated access code of varying length and type of digit. According to some embodiments, the length and type of digit of the randomly generated access code can depending on the type information held in the account of the user. For example, in some embodiments, the access code could be generated for an account associated with online banking and the access code could be a randomly generated 16-digit alphanumeric code. In some embodiments, the access code could be generated for an account associated with online shopping and the access code could be a randomly generated 8-bit numeric code. It will be appreciated by those of skill in the art that the length and type of code could vary based on the application. In some embodiments, the access code associated with an account of the user is only valid for a predetermined period of time. According to some embodiments, the access code associated with an account of the user is only valid for a single use.

At step 520, user device 102 may display the access code associated with an account of the user for use in association with a credentialless login attempt. For example, in some embodiments, user device 102 may, by processor 302, transfer the data representing an access code associated with the account of the user from I/O 220 to display 306. In some embodiments, display 306 may be a screen associated with user device 102, such as for example a screen of a mobile phone, tablet, or other mobile computing device. According to some embodiments, the user may input the access code displayed on user device 102 on a different user device, such as user device 104, in connection with a credentialless login attempt.

Figure 6:
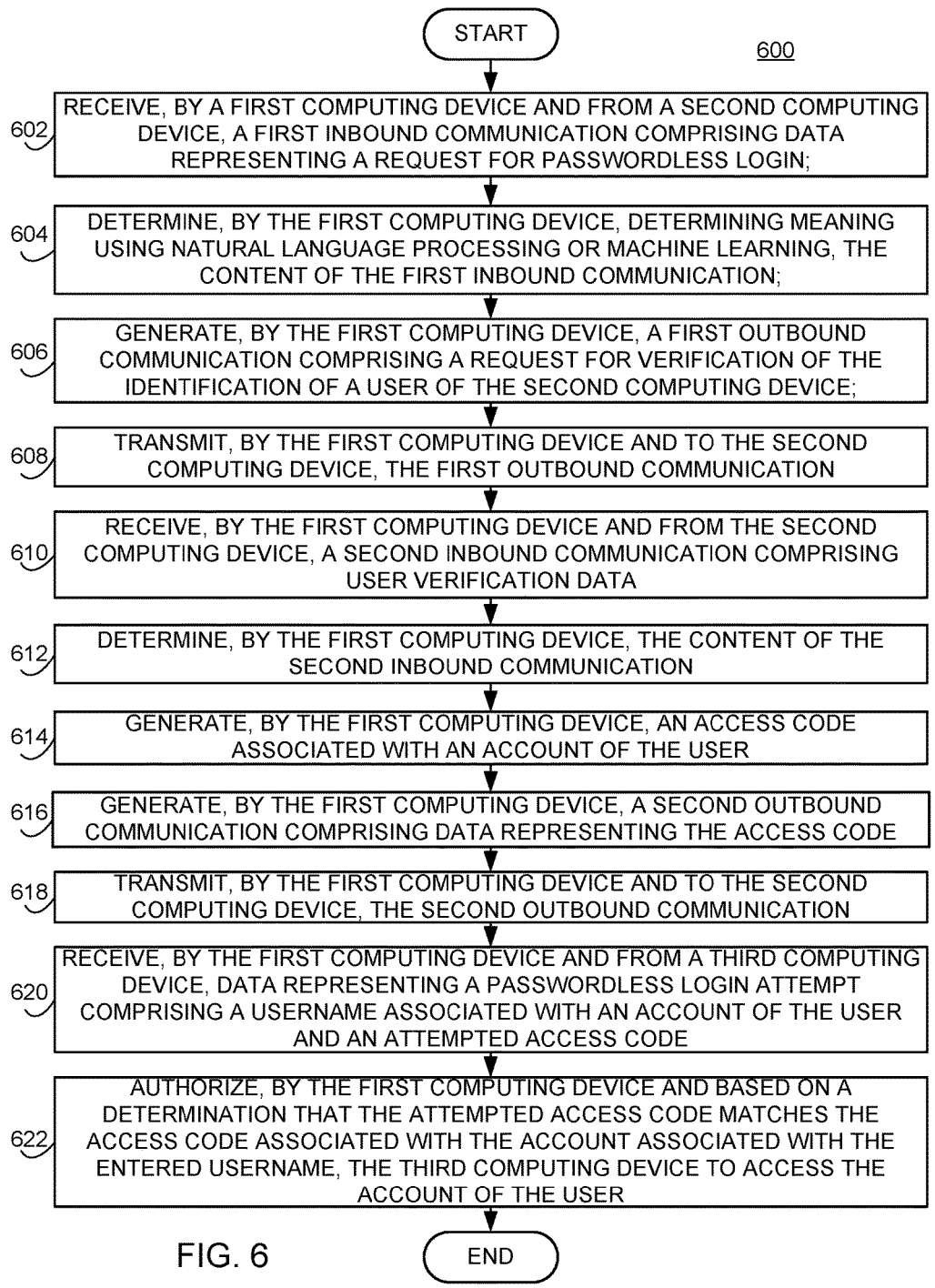
FIG. 6 is a flowchart of an exemplary method for providing passwordless login.

FIG. 6 shows a flowchart of a method 600 for providing users with the ability to complete a passwordless login using a username and a random one-time passcode. Method 600 may be performed by authentication device 120 using processor 210 to execute memory 240. In some embodiments, steps of method 600 may be performed other elements in system 100, such as user devices 102, 104, third party server 126, web server 110, communication server 112, transaction server 114, or CSR terminal 122. Following method 600, the system may generate a random one-time passcode, for example, by authentication device 120, may transmit the code to the user, for example, by communication server 112 and to user device 102, and may authorize access to a user that enters the username associated with the user's account and the passcode into a website via another user device, for example, via user device 104.

In block 602, organization 108 may receive a first inbound communication from user device 102 comprising data representing a request for passwordless login. For example, in some embodiments, a user may send a message, such as a text message, from user device 102 requesting a passcode to for a passwordless login. In some embodiments, organization 108 may receive the inbound communication (e.g., text message, sms message, etc) at communication server 112 through network 106. According to some embodiments, organization 108 may receive the inbound communication (e.g., text message, sms message, etc) at CSR terminal 122 through network 106. In some embodiments, organization 108 may receive the inbound communication (e.g., text message, sms message, etc) at transaction server 114 through network 106. In some embodiments, the message may be transmitted through a secure channel between organization 108 and user device 102. As previously discussed, in some embodiments, the communication channel between the software application running on user device 102 and organization 108 may be encrypted using standard protocols such as TLS, TCP, SSH, or other appropriate protocols. In some embodiments, the communication channel between the software application running on user device 102 and organization 108 may be encrypted using application or organization specific protocols specifically developed for the organization.

At step 604, organization 108 may determine the contents of the inbound communication. For example, in some embodiments, communication server 112 may through natural language processing, machine learning, or other suitable analysis technique determine that the inbound communication received from user device 102 through network 106 comprises a request for a one-time passcode. In some embodiments, CSR 122 may through natural language processing, machine learning, or other suitable analysis technique determine that the inbound communication received from user device 102 through network 106 comprises a request for a one-time passcode. According to some embodiments, transaction server 114 may through natural language processing, machine learning, or other suitable analysis technique determine that the inbound communication received from user device 102 through network 106 comprises a request for a one-time passcode. In some embodiments, authentication device 120 may through natural language processing, machine learning, or other suitable analysis technique determine that the inbound communication received from user device 102 through network 106 comprises a request for a one-time passcode.

At step 606, organization 108 may generate a first outbound communication comprising a request for verification of the identification of a user of a software application on user device 102. For example, in some embodiments, authentication device 120 may send data representing a request for verification of the identification of a user of a software application on user device 102 to communication server 112. According to some embodiments, communication server 112 may then generate a message based on the data to be transmitted to user device 102. In some embodiments, the first outbound communication may be an SMS messages. For example, according to some embodiments, communication server 112 may generate an SMS or text message including the data representing the access code that is transmitted through the network 106 to user device 102. According to some embodiments, communication server 112 may generate a message based on the data in such a way that it will be distributed by an IVR system. In some embodiments, the message may be transmitted through a secure channel between organization 108 and user device 102. As previously discussed, in some embodiments, the communication channel between the software application running on user device 102 and organization 108 may be encrypted using standard protocols such as TLS, TCP, SSH, or other appropriate protocols. In some embodiments, the communication channel between the software application running on user device 102 and organization 108 may be encrypted using application or organization specific protocols specifically developed for the organization.

At step 608, organization 108 may transmit the first outbound communication to user device 102. In some embodiments, the first outbound communication may comprise data representing a request for verification of the identification of a user of a software application on user device 102. For example, in some embodiments, authentication device 120 may send the first outbound communication to communication server 112 through local network 116, and communication server 112 may generate a communication or message based on the data representing the access code that is transmitted to user device 102 through network 106. In some embodiments, the first outbound communication may be an SMS message. For example, in some embodiments, communication server 112 may generate an SMS or text message based on the data representing a request for verification of the identification of a user of a software application on user device 102 that is transmitted through the network 106 to user device 102. In some embodiments, the first outbound communication may be IVR system data. For example, in some embodiments, communication server 112 may generate a message or communication based on the data representing a request for verification of the identification of a user of a software application on user device 102 that will be distributed by an IVR system and may place a phone call to user device 102 wherein the IVR system reads the communication to the user. In some embodiments, the message may be transmitted through a secure channel between organization 108 and user device 102. As previously discussed, in some embodiments, the communication channel between the software application running on user device 102 and organization 108 may be encrypted using standard protocols such as TLS, TCP, SSH, or other appropriate protocols. In some embodiments, the communication channel between the software application running on user device 102 and organization 108 may be encrypted using application or organization specific protocols specifically developed for the organization.

At step 610, organization 108 may receive a second inbound communication comprising user verification data, wherein user verification data comprises data representing an indication that the user's identity has been verified by user device 102. For example, in some embodiments, organization 108 may receive data at authentication device 120 and from user device 102 representing an indication that biometric data associated with the user that is obtained by user device 102 matches, within a predetermined confidence level, to known biometric data associated with the user and stored on user device 102. For example, in some embodiments, organization 108 may receive biometric information from a user that may be converted into data and the organization 108 can compare the data to known data. In some embodiments, if the received data matches the known data by a predetermined threshold (e.g, 50%, 60%, 95%, etc), then the data will be deemed to match. In some embodiments, organization 108 may receive data from authentication device 120 representing an indication that biometric data associated with the user that is obtained by ED 308 of user device 102 matches, within a predetermined confidence level, to known biometric data associated with the user and stored on database 118. In some embodiments, the biometric data associated with the user of user device 102 and the known biometric data are fingerprint data obtained from a fingerprint scanner of user device 102 (i.e., ED 308 of user device 102). According to some embodiments, the biometric data associated with the user of user device 102 and the known biometric data are voice recordings obtained from a microphone of user device 102 (i.e., ED 308 of user device 102). In some embodiments, the biometric data associated with the user of user device 102 and the known biometric data are image data obtained from an image capture device associated with user device 102 (i.e., ED 308 of user device 102). In some embodiments, the biometric data associated with the user of user device 102 and the known biometric data are any suitable data that may be obtained from environmental data sensor, ED 308, associated with user device 102 that will serve to verify the identity of the user of an application running on user device 102.

At step 612, organization 108 may determine the contents of the second inbound communication. For example, in some embodiments, communication server 112 may through natural language processing, machine learning, or other suitable analysis technique determine that the second inbound communication received from user device 102 through network 106 comprises data indicating that user's identification has been verified. In some embodiments, CSR 122 may through natural language processing, machine learning, or other suitable analysis technique determine that the inbound communication received from user device 102 through network 106 comprises data indicating that user's identification has been verified. According to some embodiments, transaction server 114 may through natural language processing, machine learning, or other suitable analysis technique determine that the inbound communication received from user device 102 through network 106 comprises data indicating that user's identification has been verified. In some embodiments, authentication device 120 may through natural language processing, machine learning, or other suitable analysis technique determine that the inbound communication received from user device 102 through network 106 comprises data indicating that user's identification has been verified.

At step 614, authentication device 120 may generate an access code associated with an account of the user. In some embodiments, the access code associated with the account of the user is a randomly generated access code of varying length and type of digit. In some embodiments, the length and type of digit of the randomly generated access code can depending on the type information held in the account of the user. For example, in some embodiments, the access code could be generated for an account associated with online banking and the access code could be a randomly generated 16-digit alphanumeric code. According to some embodiments, the access code could be generated for an account associated with online shopping and the access code could be a randomly generated 8-bit numeric code. It will be appreciated by those of skill in the art that the length and type of code could vary based on the application. In some embodiments, the access code associated with an account of the user is only valid for a predetermined period of time. According to some embodiments, the access code associated with an account of the user is only valid for a single use.

At step 616, organization 108 may generate a second outbound communication comprising data representing the access code associated with the account of the user. For example, in some embodiments, authentication device 120 may send data representing the access code associated with the user account to communication server 112. In some embodiments, communication server 112 may then generate a message or communication based on the data to be transmitted to user device 102. In some embodiments, the second outbound communication may be an SMS messages. For example, in some embodiments, communication server 112 may generate an SMS or text message based on the data representing the access code that is transmitted through the network 106 to user device 102. According to some embodiments, communication server 112 may generate a message or communication based on the data in such a way that it will be distributed by an IVR system. In some embodiments, the message may be transmitted through a secure channel between organization 108 and user device 102. As previously discussed, in some embodiments, the communication channel between the software application running on user device 102 and organization 108 may be encrypted using standard protocols such as TLS, TCP, SSH, or other appropriate protocols. In some embodiments, the communication channel between the software application running on user device 102 and organization 108 may be encrypted using application or organization specific protocols specifically developed for the organization.

At step 618, organization 108 may transmit the second outbound communication to user device 102. In some embodiments, the second outbound communication may comprise data representing the access code. For example, in some embodiments, authentication device 120 may send the second outbound communication to communication server 112 through local network 116, and communication server 112 may generate a message or communication based on the data representing the access code that is transmitted to user device 102 through network 106. In some embodiments, the second outbound communication may be an SMS messages. For example, in some embodiments, communication server 112 may generate an SMS or text message based on the data representing the access code that is transmitted through the network 106 to user device 102. In some embodiments, the first outbound communication may be IVR system data. For example, in some embodiments, communication server 112 may generate a message or communication based on the data representing a request for verification of the identification of a user of a software application on user device 102 that will be distributed by an IVR system. For example, in some embodiments, communication server 112 may place a phone call to user device 102 wherein the IVR system reads the generated communication to the user. In some embodiments, the message may be transmitted through a secure channel between organization 108 and user device 102. As previously discussed, in some embodiments, the communication channel between the software application running on user device 102 and organization 108 may be encrypted using standard protocols such as TLS, TCP, SSH, or other appropriate protocols. In some embodiments, the communication channel between the software application running on user device 102 and organization 108 may be encrypted using application or organization specific protocols specifically developed for the organization.

At step 620, organization 108 may receive data representing a passworldless login attempt from user device 104, the data representing the passwordless login attempt comprising a username and an attempted access code. For example, in some embodiments, a user may enter the username associated with the user's account and an attempted access code on an input device associated with user device 104, and user device 104 may transmit data representing the username and attempted access code to communication server 112 through network 106. In some embodiments, the message may be received through a secure channel between organization 108 and user device 104. In some embodiments, the communication channel between the software application running on user device 104 and organization 108 may be encrypted using standard protocols such as TLS, TCP, SSH, or other appropriate protocols. According to some embodiments, the communication channel between the software application running on user device 104 and organization 108 may be encrypted using application or organization specific protocols specifically developed for the organization.

At step 622, organization 108 authorizes, based on a determination that the attempted access code matches the access code associated with the account associated with the entered username, user device 104 to access the account of the user. For example, in some embodiments, web server 110 may receive a username and an attempted access code from input device 104 via network 106 and may send the username and an attempted access code to authentication device 120 via local network 116. In some embodiments, authentication device 120 may then retrieve the access code associated with the account associated with the entered username from database 118 and may determine whether the attempted access code matches the retrieved access code. In some embodiments, if the attempted access code matches the access code, authentication device 120 may send a message to web server 110 through local network 116 informing web server 110 to grant access to the account of the user on user device 114 via network 106. In some embodiments, authorizing user device 104 to access the account of the user may further be based on a determination that the access code is valid. In some other embodiments, determining that the access code is valid may further comprise receiving, by organization 108, device location data from each user device 102, 104 and determining that the that the device location data of user device 102 matches the device location data of user device 104. In some embodiments, device location data may be data indication the location (e.g., GPS data, longitude, latitude, triangulated position from cell tower or wifi access point, city, state, country, time zone, etc) of user devices 102, 104. In some embodiments, for example, the access code may only be valid for a predetermined period of time. For example, in some embodiments, the access code may expire five minutes after it is created. According to some embodiments, the access code may expire five minutes after it is transmitted to user device 102. In some embodiments, determining that the access code is valid may further comprise determining whether or not the predetermined period of time has passed. In some embodiments, the access code may only be valid for a single use. According to some embodiments, determining that the access code is valid may further comprise determining whether or not the access code has been previously received by organization 108.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXEMPLARY USE CASES

The following exemplary use case describes one example of a typical user flow pattern. It is intended solely for explanatory purposes and not in limitation. A user may desire to login to an account on website without entering the credentials (e.g., username and password) associated with the account. The user may request (e.g., via user device 102) to complete a login without entering the credentials. For example, the user may open an application on their mobile device associated with the website they desire to login into and make a request for a one-time passcode. Before granting the request, the system (e.g., via organization 108) may require the user to verify his or her identity through the application. The user may accomplish the identity verification by entering biometric data to be compared against known biometric data (e.g., via user device 102). For example, a user may enter their fingerprint data through a fingerprint scanner on the user's mobile device, and the application running on the user's mobile device may compare the entered fingerprint to a fingerprint known to be from the user stored on the mobile device as a means of verifying the user's identity. Alternatively, a user may record an audio clip through a microphone on the user's mobile device, and the application running on the user's mobile device may compare the recorded audio to an audio clip of the user stored on the mobile device as a means of verifying the user's identity. Once the system receives verification of the user's identity (e.g., via communication server 112), the system may generate a random one-time password associated with the user's account (e.g., via authentication device 120) and send that one-time password to the mobile application. For example, the system may generate a random 8-digit passcode that is only able to be used one time and that expires after a predefined passage of time. The application on the user's mobile device may then display the passcode to the user (e.g., via display 306). The user may then enter the passcode in a website running on a different device (e.g., user device 104). For example, the user may receive the passcode on their mobile phone and enter the passcode in a web browser on their desktop or laptop computer. The system then may make sure that the passcode entered is a valid passcode (e.g., via authentication device 120). For example, the system may verify that the passcode is associated with a user of the organization and may verify that the passcode has not expired either because it has already been entered or because too much time has transpired. As an additional security measure, the system may verify that the user's mobile device and the desktop or laptop are in similar locations or that the devices have been previously associated with the user's account before granting access to the user's account. After the system verifies the passcode, the user is granted access to his or her account on the desktop or laptop that the passcode was entered on, thus allowing the user to access their account without having to remember or enter any credentials, such as a username or password, associated with their account.

An additional use case may be where a user may desire to login to an account on website without entering their account credentials or accessing a mobile application to generate a one-time passcode. As with the prior use case, the following exemplary use case describes one example of a typical user flow pattern. It is intended solely for explanatory purposes and not in limitation. A user may desire to login to an account on website without entering the password associated with the account. The user may request (e.g., via user device 102) to complete a login without entering the password. For example, the user may send a text message from their mobile device requesting a one-time passcode. The system (e.g., via organization 108) may receive the text message and determine the contents of the message (e.g., via communication server 112). For example, the system may receive a text message from the user and, through natural language processing or machine learning techniques, may determine that the user is requesting a one-time passcode. Before granting the request, the system may generate and send a message indicating that the user must verify his or her identity before proceeding. For example, the system may generate a message indicating that the user's identity needs to be verified (e.g., via communication server 112) and may send the message to an application associated with the organization running on the user's mobile device (e.g., via transaction server 114). The user may accomplish the identity verification by entering biometric data to be compared against known biometric data (e.g., via user device 102). For example, a user may enter their fingerprint data through a fingerprint scanner on the user's mobile device, and the application running on the user's mobile device may compare the entered fingerprint to a fingerprint known to be from the user stored on the mobile device as a means of verifying the user's identity. Alternatively, a user may record an audio clip through a microphone on the user's mobile device, and the application running on the user's mobile device may compare the recorded audio to an audio clip of the user stored on the mobile device as a means of verifying the user's identity. Alternatively, a user may already be logged into the mobile application running in the background of the device, thus allowing the organization to communicate with the application to verify the user's identity. The user's device then sends a message to the system indicating that the user's identity has been verified. Once the system receives verification of the user's identity (e.g., via communication server 112), the system may generate a random one-time password associated with the user's account (e.g., via authentication device 120). The system may then generate a message to send to the user's device with the random one-time password included. For example, after the system generates a random 8-digit passcode that is only able to be used one time and that expires after a predefined passage of time, and then create and send a text message to the user's mobile device indicating the one-time passcode. The user's mobile device will receive the message and display the message to the user (e.g., via display 306). The user may then enter the username associated with their account and the passcode in a website running on a different device (e.g., user device 104). For example, the user may receive the passcode on their mobile phone and enter their username and the passcode in a web browser on their desktop or laptop computer. The system then makes sure that the passcode entered is a valid passcode (e.g., via authentication device 120). For example, the system may verify that the passcode is associated with a user of the organization and may verify that the passcode has not expired either because it has already been entered or because too much time has transpired. Additionally, the system may verify that the user's mobile device and the desktop or laptop are in similar locations or that the devices have been previously associated with the user's account. After the system verifies the passcode, the user is granted access to his or her account on the desktop or laptop that the passcode was entered on, thus allowing the user to access their account without having to remember or enter the password associated with their account. Additionally, the user is able to complete all interactions with the system by simply sending and receiving messages as opposed to navigating through one or more mobile applications that can interact with the system.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A system for providing a credentialless login, comprising:
    one or more processors of an authentication device; and
    a memory in communication with the one or more processors and storing instructions that, when executed by the one or more processors, are configured to cause the system to:
        receive, from a software application running on a first user-device, a request for credentialless login;
        responsive to receiving an authentication of a user accessing the software application running on the first user-device, generate an access code for a credentialless login for an account of the user;
        transmit, to the software application running on the first user-device, data representing the generated access code;
        receive, from a second user-device, data representing a credentialless login attempt, the data representing the credentialless login attempt comprising an attempted access code; and
        authorize, based on a determination that the attempted access code matches the generated access code, the second user device to access the account of the user.

2. The system of claim 1, wherein authorizing the second user device to access the account of the user is further based on at least a determination that the attempted access code is valid.

3. The system of claim 2, wherein determining that the attempted access code is valid further comprises:
    receiving, from the first user-device, first user-device location data representative of a location of the first user-device; and
    receiving, from the second user device, second user device location data representative of a location of the second user device;
    determining that the first user-device location data matches the second user device location data within a predetermined confidence level.

4. The system of claim 2, wherein the generated access code associated with an account of the user is only valid for a predetermined period of time and only for a single use.

5. The system of claim 4, wherein determining that the attempted access code is valid further comprises determining whether the predetermined period of time has passed.

6. The system of claim 4, wherein determining that the attempted access code is valid further comprises determining whether the attempted access code has been previously received by the authentication device.

7. The system of claim 1, wherein a first communication channel between the authentication device and the first user device is encrypted and a second communication channel between the authentication device and the second user is encrypted.

8. The system of claim 1, wherein receiving an authentication of a user running a software application on the first user device comprises:
    receiving, from the first user device, data representing an indication that biometric data associated with the user that is obtained by the first user device matches, within a predetermined confidence level, to known biometric data stored on the first user device, wherein the known biometric data is associated with the user.

9. The system of claim 8, wherein biometric data associated with the user that is obtained by the first user device and the known biometric data stored on the first user device are fingerprint data obtained by a fingerprint scanner of the first user device.

10. The system of claim 8, wherein biometric data associated with the user that is obtained by the first user device and the known biometric data stored on the first user device are voice recordings obtained from a microphone of the first user device.

11. The system of claim 8, wherein biometric data associated with the user that is obtained by the first user device and the known biometric data stored on the first user device are image data obtained from an image capture device associated with the first user device.

12. The system of claim 1, wherein receiving an authentication of a user accessing the software application running on the first user device comprises:
   receiving, from the first user device, data representing biometric data associated with the user that is obtained by the first user device;
   comparing data representing biometric data associated with the user that is obtained by the first user device with known biometric data stored on the authentication device;
   responsive to verifying that the data representing biometric data associated with the user that is obtained by the first user device matches the known biometric data stored on the authentication device, transmitting data representing an indication that the user's identity has been verified.

13. The system of claim 12, wherein biometric data associated with the user that is obtained by the first user device is one of fingerprint data obtained by a fingerprint scanner of the first user device, voice recordings obtained from a microphone of the first user device, or image data obtained from an image capture device associated with the first user device.

14. A system for providing a credentialless login, comprising:
   one or more processors of a first user device; and
   a memory in communication with the one or more processors and storing instructions that, when executed by the one or more processors, are configured to cause the system to:
      receive, by a sensor associated with the first user device, known biometric data associated with a user;
      store the known biometric data associated with the user;
      receive, by a software application running on the first user device, login credentials associated with a user of the software application running on the first user device;
      receive, by a software application running on the first user device, data representing a request for credentialless login;
      obtain, by a sensor associated with the first user device, user identification data, wherein user identification data comprises data representing biometric data associated with the user;
      compare the user identification data with the known biometric data associated with the user and stored by the first user device;
      responsive to determining that the user identification data matches the known biometric data, within a predetermined confidence level, transmit, to an authentication-device, user verification data, wherein user verification data comprises data representing an indication that the user's identity has been verified;
      transmit, to the authentication device, a user verification communication, wherein the user verification communication comprises data representing a request for credentialless login;
      receive, from the authentication device, data representing an access code for a credentialless login associated with an account of the user; and
      output for display, by an application running on the first user device, the access code associated with an account of the user for use in association with a credentialless login attempt at a, user device.

15. The system of claim 14, wherein the user identification data is one of fingerprint data obtained by a fingerprint scanner of the first user device, voice recordings obtained from a microphone of the first user device, or image data obtained from an image capture device associated with the first user device.

16. The system of claim 14, wherein the login credentials comprise a username and a password.

17. A system for providing a passwordless login, comprising:
   one or more processors of a first computing device; and
   a memory in communication with the one or more processors and storing instructions that, when executed by the one or more processors, are configured to cause the system to:
      receive, from a software application running on a first user device, a first inbound communication comprising data representing a request for passwordless login, the first inbound communication being an SMS message;
      determine, using natural language processing or machine learning, the content of the first inbound communication;
      generate a first outbound communication comprising a request for verification of the identification of a user of the first user device;
      transmit, to the application running on the first user device, the first outbound communication;
      receive, from the application running on the first user device, a second inbound communication comprising user verification data, wherein user verification data comprises data representing an indication that the user's identity has been verified by the first user device, wherein the second inbound communication is an SMS message;
      determine, using natural language processing or machine learning, the content of the second inbound communication;
      generate an access code for a passwordless login associated with an account of the user;
      generate a second outbound communication comprising data representing the access code;
      transmit, to the application running on the first user device, the second outbound communication;
      receive, from a second user device, data representing a passwordless login attempt comprising a username associated with an account of the user and an attempted access code; and
      authorize, based on a determination that the attempted access code matches the access code associated with the account associated with the entered username, the second user device to access the account of the user.

18. The system of claim 17, wherein the first inbound communication, the second inbound communication, the first outbound communication, and the second outbound communication are SMS messages.

19. The system of claim 17, wherein receiving a second inbound communication comprising user verification data further comprises:
   receiving, from the first user device, a second inbound communication comprising an indication that biometric data associated with the user running a software application on the first user device that is obtained by a sensor associated with the first user device matches, within a predetermined confidence level, to known biometric data stored on the first user device, wherein the known biometric data is associated with the user; and determining, using natural language processing or machine learning, the content of the second inbound communication.

20. The system of claim 1, wherein receiving an authentication of a user accessing a software application running on the first user device comprises:

receiving, from the first user device, data representing an indication that an authenticating motion associated with the user that is obtained by a gyroscope of the first user device matches, within a predetermined confidence level, to a known authenticating motion stored on the first user device, wherein the known authentication motion is associated with the user.

* * * * *